US009346007B2

(12) United States Patent
Reddy et al.

(10) Patent No.: US 9,346,007 B2
(45) Date of Patent: May 24, 2016

(54) TWO-STAGE QUENCH SCRUBBER

(75) Inventors: Satish Reddy, Irvine, CA (US); Jeffrey Scherffius, Alisa Viejo, CA (US); Valerie Francuz, Rancho Santa Margarita, CA (US)

(73) Assignee: Fluor Technologies Corporation, Sugar Land, TX (US)

( * ) Notice: Subject to any disclaimer, the term of this patent is extended or adjusted under 35 U.S.C. 154(b) by 709 days.

(21) Appl. No.: 12/095,771

(22) PCT Filed: Dec. 14, 2006

(86) PCT No.: PCT/US2006/048049
§ 371 (c)(1),
(2), (4) Date: Oct. 3, 2008

(87) PCT Pub. No.: WO2007/075485
PCT Pub. Date: Jul. 5, 2007

(65) Prior Publication Data
US 2009/0148371 A1     Jun. 11, 2009

Related U.S. Application Data

(60) Provisional application No. 60/752,550, filed on Dec. 19, 2005.

(51) Int. Cl.
*B01D 53/14*    (2006.01)
*B01D 53/60*    (2006.01)

(52) U.S. Cl.
CPC ............ *B01D 53/1456* (2013.01); *B01D 53/60* (2013.01)

(58) Field of Classification Search
None
See application file for complete search history.

(56) References Cited

U.S. PATENT DOCUMENTS

| | | | |
|---|---|---|---|
| 3,843,789 A * | 10/1974 | Spector et al. | ........... 423/243.06 |
| 3,920,421 A | 11/1975 | Collins | |
| 4,322,392 A | 3/1982 | Gleason | |
| 4,400,362 A * | 8/1983 | Lerner | ........................ 423/235 |
| 4,634,582 A | 1/1987 | Sliger et al. | |

(Continued)

FOREIGN PATENT DOCUMENTS

| | | |
|---|---|---|
| DE | 3733319 A1 | 4/1989 |
| GB | 2050325 A | 1/1981 |

(Continued)

OTHER PUBLICATIONS

"Process for Treatment of Waste Gas Containing Harmful Component", JP Patent Application No. 2-59017, filed Feb. 28, 1990 (translation).

*Primary Examiner* — Melvin C Mayes
*Assistant Examiner* — Sheng H Davis
(74) *Attorney, Agent, or Firm* — Conley Rose, P.C.; Kristin Jordan Harkins

(57) ABSTRACT

Contemplated configurations and methods for flue gas treatment comprise a quench section and a scrubbing section that are configured and operated to avoid net condensation of water from the quenched flue gas in the scrubbing section. Consequently, the active agent in the scrubbing medium can be maintained at high concentration and will so allow continuous removal of SOX and NOX to very low concentrations. Moreover, as the scrubbing medium is not diluted by condensate, loss of active agent can be substantially reduced. Especially preferred systems will reduce SO2 concentrations in flue gas to less than 5 ppm, and more typically less than 3 ppm while substantially reducing water and reagent consumption.

18 Claims, 1 Drawing Sheet

(56) References Cited

U.S. PATENT DOCUMENTS

| | | | |
|---|---|---|---|
| 4,636,377 A * | 1/1987 | Heisel et al. | 423/575 |
| 4,687,649 A * | 8/1987 | Kuroda et al. | 423/243.03 |
| 4,753,784 A * | 6/1988 | Neverman | 423/235 |
| 5,120,517 A | 6/1992 | Elshout | |
| 5,154,734 A | 10/1992 | Yung | |
| 5,246,678 A * | 9/1993 | Ochi et al. | 423/243.08 |
| 5,405,590 A * | 4/1995 | Macedo et al. | 423/210 |
| 5,607,654 A | 3/1997 | Lerner | |
| 5,658,547 A * | 8/1997 | Michalak et al. | 423/243.08 |
| 5,720,926 A * | 2/1998 | Whipp et al. | 422/110 |
| 6,126,910 A | 10/2000 | Wilhelm et al. | |
| 6,139,807 A | 10/2000 | Risse et al. | |
| 6,273,940 B1 * | 8/2001 | Bielawski et al. | 95/228 |
| 6,656,249 B1 * | 12/2003 | Buisman et al. | 95/195 |
| 6,676,912 B1 * | 1/2004 | Cooper et al. | 423/235 |
| 6,991,769 B2 * | 1/2006 | Kaneko et al. | 422/187 |
| 2003/0019356 A1 * | 1/2003 | Herden et al. | 95/108 |
| 2005/0028672 A1 * | 2/2005 | Hickerson et al. | 95/90 |
| 2008/0044333 A1 * | 2/2008 | Hakka et al. | 423/239.1 |

FOREIGN PATENT DOCUMENTS

| | | |
|---|---|---|
| GB | 2208163 A | 3/1989 |
| JP | 52007870 A | 1/1977 |
| JP | 60-172335 | 9/1985 |
| JP | 02-059017 | 2/1990 |
| JP | 259017 A | 2/1990 |
| JP | hei2-59017 | 2/1990 |

\* cited by examiner

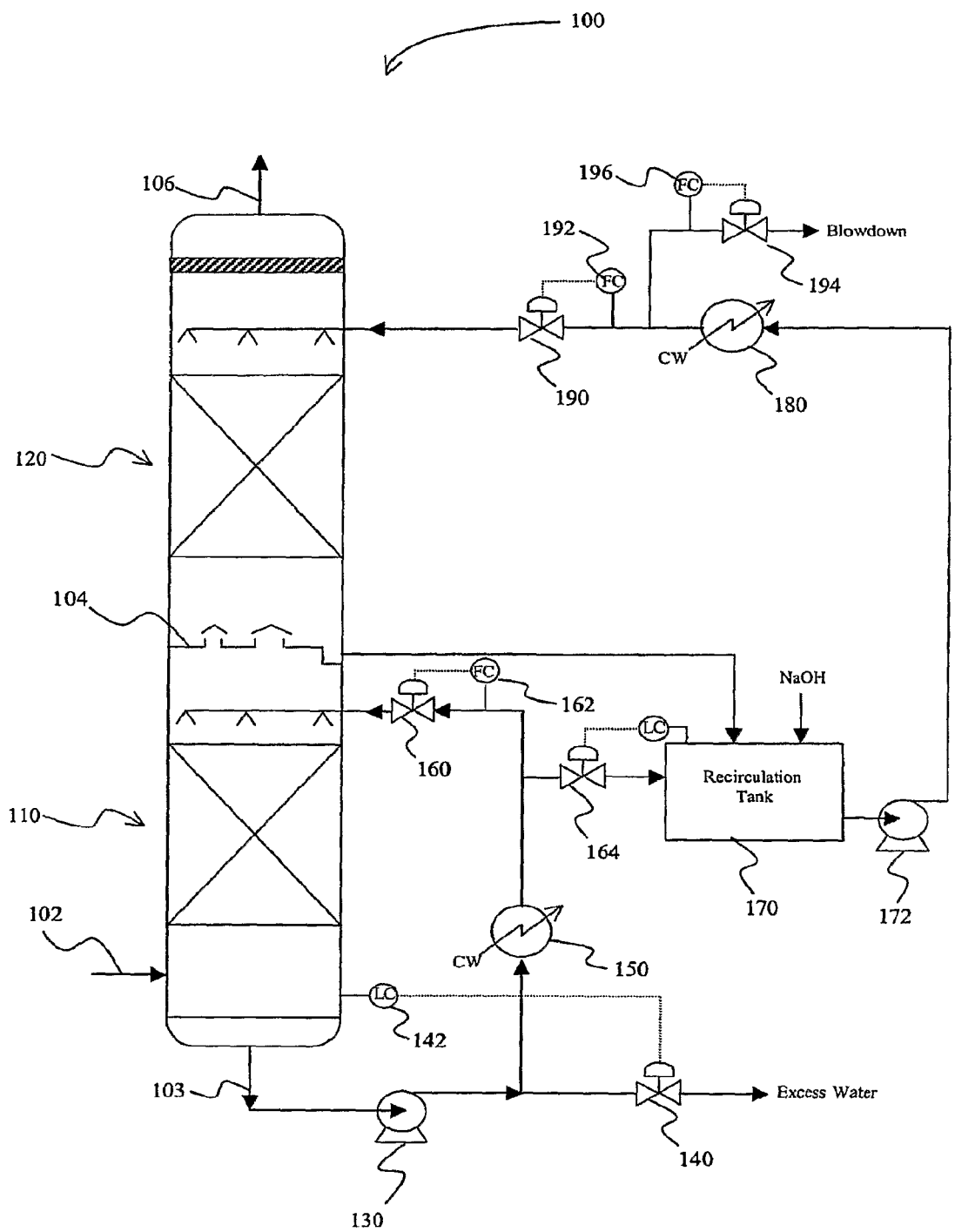

TWO-STAGE QUENCH SCRUBBER

This application claims priority to our U.S. provisional patent application with the Ser. No. 60/752,550, which was filed Dec. 19, 2005 and PCT/US06/48049, filed Dec. 14, 2006.

FIELD OF THE INVENTION

The field of the invention is flue gas treatment, and especially as it relates to flue gas quenching and acid gas removal.

BACKGROUND OF THE INVENTION

Flue gas quenching and acid gas removal (especially removal of $SO_x$ and $NO_x$) from flue gases is often performed in a single quench reactor/contactor in which the hot flue gas is contacted with an aqueous solution of sodium hydroxide to thereby reduce temperature and the acid gas content in the flue gas. Such flue gas treatment is conceptually relatively simple and effective for $SO_x$ and $NO_x$ removal, however, several problems remain. Among other things, the caustic and loaded aqueous solution typically requires treatment and/or other processing steps before the water from these solutions can be released into the sewer system without negative environmental impact. Moreover, $SO_2$ content of less than 50 ppm in the treated gas from such devices is typically not achieved.

Other known flue gas treatment configurations may employ dual or multiple reactors in which separate reactions are performed as described, e.g., in U.S. Pat. No. 4,400,362. Here, a first reactor is operated as sulfurous acid conversion scrubber that also generates reactive nitrogen oxides (e.g., $N_2O_3$), which are then absorbed in a second stage by an alkali metal ammonium salt or hydroxide using complex reaction kinetics between $SO_2$ and $NO_x$ in water in the presence of $O_2$. Typically, the solvents produced by such systems are not suitable for discharge to sewer or re-use in facility, and the vented gas will typically have a SOx level of above 50-100 ppm. Similar problems are encountered in U.S. Pat. No. 3,920,421 in which water is used as the sorbent for NOx and $SO_x$.

In further known configurations, as shown in U.S. Pat. No. 5,607,654, the incinerator gases from a medical waste treatment plant are first contacted with a dry reagent to thereby immobilize/convert acid gases on a dry solid that is subsequently removed in baghouse or electrostatic precipitator. So treated gas is then quenched in a quench pipe and subsequently scrubbed using acid liquor to remove toxic organic compounds. Water from the treated gas and the quench step is carried over to the scrubber, and excess liquor is routed back to the incinerator. While such configurations eliminate at least in some configurations the need for waste water purification, substantial quantities of water are nevertheless required. Moreover, as the quench water is carried over to the scrubbing stage, scrubbing solvent is continuously diluted and must be replenished. Worse yet, due to the dilution of the scrubbing solvent, the absorption capacity of $SO_x$ and other contaminants is reduced.

Alternatively, as described in U.S. Pat. No. 5,154,734, waste gas is routed through a quencher to saturate the waste gas with water. So loaded waste gas is then fed to a wet scrubber in which the water in the waste gas is condensed to thereby enhance fine particle, acid gas and heavy metal recovery. Further removal of the contaminants leaving the scrubber in the treated gas is then achieved using a collision scrubber/entrainment separator. While such systems provide at least some advantages, various disadvantages nevertheless remain. Among other things, the quantity of circulating water (e.g., between wet scrubber and quench section) is relatively large. Furthermore, the contaminant laden water can not be discharged into the sewer system but must be regenerated in a separate facility.

In yet another configuration, flue gas is first contacted with sulfite or bisulfite to thus reduce the $SO_3$ and/or hydrogen halide concentration in the flue gas. Remaining $SO_2$ is then removed in a wet scrubber (a typical configuration is described in U.S. Pat. No. 6,126,910). While such systems provide some improvements (e.g., reduction of downstream components) other difficulties remain. For example, $SO_3$ removal from the pretreated stream is performed in a single stage quench scrubber.

Thus, while numerous configurations and methods of flue gas treatment are known in the art, all or almost all of them, suffer from one or more disadvantages. Therefore, there is still a need for improved configurations and methods of flue gas treatments.

SUMMARY OF THE INVENTION

The present invention is directed to configurations and methods of flue gas treatment in which $SO_x$ concentration is reduced using a two-stage system in which in a first stage the flue gas is quenched and in which in a second stage the quenched flue gas is scrubbed. Most preferably, first and/or second stages are configured and/or operated such that substantially no net condensation of water occurs in the scrubbing stage. Consequently, high $SO_x$ removal is achieved by maintaining high scrubbing agent concentration, which further advantageously reduces loss of scrubbing agent and water.

In one aspect of the inventive subject matter, a method of treating a flue gas includes a step of feeding a flue gas at a first temperature to a quench section and quenching the flue gas in the quench section to a second temperature using water as a quench medium. In another step, the quenched flue gas is fed to a scrubbing section and the quenched flue gas is scrubbed using a caustic in a scrubbing fluid at a concentration effective to continuously reduce $SO_x$ content in scrubbed flue gas to equal or less than 10 ppm. It is generally preferred in such methods that the first and second sections are configured and operated to substantially avoid net condensation of water in the scrubbing section. Furthermore, to minimize footprint of the system, it is preferred that the first and second sections are disposed in a single tower. Where desirable, the quench medium can be released to a sewer or process component of a plant with little or no treatment (optionally after neutralizing).

Particularly contemplated flue gas sources include coal incinerators, hydrocarbon fuel fired incinerators, and natural gas fired incinerators. Therefore, the first temperature may be between about 400° C. and about 200° C. Most typically, the quench section is configured and operated such that the second temperature is between about 90° C. and about 20° C., and that less than 10% of total $SO_x$ is absorbed in the quench section. Where desired, the quench medium may be circulated in a quench circuit and cooled by a cooler prior to re-entry into the quench section. Preferred caustics include earth alkaline metal hydroxides, alkaline metal hydroxides, and/or ammonium hydroxide, and the concentration of the caustic is preferably continuously held above a predetermined limit (e.g., corresponding to initial addition of caustic in an amount of at least 8 wt %, and more preferably at least 10 wt %).

Therefore, and viewed from a different perspective, a method of reducing $SO_x$, and particularly $SO_2$ in flue gas to a concentration of less than 10 ppm will include a step of quenching the flue gas with a quench medium to a temperature and under conditions such that a concentrated downstream scrubbing medium remains substantially undiluted by condensation of water from the earlier quenched flue gas. Most preferably, the quench medium is water and the scrubbing medium comprises a caustic. Quenching is performed such that less than 10% of total $SO_x$ is absorbed in the quench section.

In another aspect of the inventive subject matter, a flue gas treatment system includes a quench section that is configured to receive a flue gas at a first temperature, wherein the quench section is further configured to reduce the temperature of the flue gas to a second temperature using water as a quench medium. Such system further comprises a scrubbing section fluidly coupled to the quench section and configured to receive the quenched flue gas at the second temperature, wherein the scrubbing section is further configured to contact the quenched flue gas with a caustic solvent. Preferably, the quench section and the scrubbing section are configured to allow operation in which substantially no water is condensed from the flue gas in the quench section, the scrubbing medium has a concentration effective to produce a scrubbed flue gas having a continuous $SO_2$ concentration of less than 10 ppm.

Various objects, features, aspects and advantages of the present invention will become more apparent from the following detailed description of preferred embodiments of the invention.

BRIEF DESCRIPTION OF THE DRAWING

FIG. 1 is an exemplary configuration of a two-stage quench scrubber according to the inventive subject matter.

DETAILED DESCRIPTION

The inventors have unexpectedly discovered that flue gas can be effectively treated to remove $SO_x$ and other contaminants to a low level in a manner that conserves both scrubbing medium and water as a resource. Most typically, contemplated systems use separate solvent circulation systems in which the flue gas is first quenched with a quench medium in the first system, and in which the quenched flue gas is scrubbed using a caustic aqueous solvent in a second system. Most preferably, both systems operate in single column configuration for cost and plot area minimization.

In one preferred aspect of the inventive subject matter, a method of treating a flue gas will therefore include a step of feeding a flue gas at a first temperature to a quench section and quenching the flue gas in the quench section to a second temperature using water as a quench medium. In another step, the quenched flue gas is fed to a scrubbing section and the quenched flue gas is scrubbed using a caustic as a scrubbing fluid at a concentration effective to continuously reduce $SO_2$ content in scrubbed flue gas to equal or less than 10 ppm, wherein the first and/or second sections are configured and operated to substantially avoid net condensation of water in the scrubbing section.

The term "continuously reduce $SO_x$ content in scrubbed flue gas to equal or less than 10 ppm" as used herein refers to a process in which $SO_x$ content in the scrubbed flue gas will not rise above 10 ppm during regular operation (i.e., excluding start-up and shut-down). As also used herein, the term "net condensation of water in the scrubbing section" refers to an increase in water content in the scrubbing section, wherein the increase is due to condensation of the water in the gas that is to be scrubbed, and wherein the term "substantially avoid" in conjunction with the net condensation means that the amount of water added to the scrubbing section by the net condensation is less than 10%, more typically less than 5%, and most typically less than 3% of the volume of the scrubbing fluid in 24 hours. As still further used herein, the term "SOx" refers to $SO_2$ and $SO_3$, and all other species in equilibrium with $SO_2$ and $SO_3$. Similarly, the term "NOx" refers to $NO_2$ and $NO_3$, and all other species in equilibrium with $NO_2$ and $NO_3$.

An exemplary configuration is schematically depicted in FIG. 1 in which two-stage quench scrubber 100 has a quench section 110 and a scrubbing section 120. Flue gas 102, at a temperature of about 300° C., is provided by a coal fired incinerator (not shown) and fed to the quench scrubber 100. Quench section 110 uses water as quench medium, which is withdrawn as stream 103 from the bottom of the quench scrubber 100 to circulation pump 130. If needed, excess water is drained from the system via control valve 140, which is typically under the control of a level sensor 142 circuit. It should be especially noted that the excess water is substantially free of $SO_2$ (i.e., less than 10%, and more typically less than 5% of all $SO_2$ in flue gas is absorbed into quench water), and that the absorbed $CO_2$ can be easily removed in a decarbonizer (which may be optionally recovered in a $CO_2$ removal section). Furthermore, hydrated $SO_x$ species as well as other ionic components may be removed in a downstream ion exchange resin. Therefore, excess water leaving the quench section is suitable for reuse in a plant, or can be safely disposed of in a sewer or other wastewater sink.

The remaining quench water is cooled in cooler 150 and routed back to the top of the quench section 110 under the control of a flow control circuit 162 via control valve 160. Alternatively, or additionally, control valve 164 may be opened to feed water to the caustic recirculation tank 170 as appropriate. The so quenched flue gas then passes through chimney tray 104 up into the scrubbing section 120. Scrubbing medium (typically an aqueous solution corresponding to initial addition of caustic in an amount of at least of 8-15 wt % NaOH) is introduced near the top of the quench scrubber and, after contact with the quenched gas, withdrawn at the chimney tray 104 to the recirculation tank 170 via pump 172. Active scrubbing agent (here: NaOH) is added to the tank as appropriate to maintain a desired concentration. Optional cooler 180 cools the scrubbing medium, but cooling of the scrubbing medium is typically not required. At least some of the scrubbing medium can be withdrawn from the system via control valve 194 and flow control circuit 196. Flow control valve 190 controls via flow control circuit 192 flow of the cooled scrubbing medium to the scrubbing section 120, and quenched and scrubbed flue gas 106 leaves the two-stage quench scrubber.

With respect to suitable flue gas sources, it is contemplated that all flue gas producing incinerators (burners) that at least temporarily provide a flue gas with an acid gas content above an acceptable limit are suitable. For example, where the acid gas is $SO_x$ (and particularly $SO_2$), contemplated contents are typically above 1 ppm, more typically above 10 ppm, and most typically between 10 and 200 ppm. Therefore, suitable flue gas sources include coal incinerators, hydrocarbon fuel fired incinerators, and natural gas fired incinerators Depending on the particular type of flue gas source, the temperatures of the flue gas may vary considerably, and typical temperatures will be between about 500° C. and about 100° C., more typically between about 400° C. and about 150° C., and most typically between about 250° C. and about 150° C. As used herein, the term "about" in conjunction with a numeral refers to a range of that numeral starting from 10% below the absolute of the numeral to 10% above the absolute of the numeral, inclusive. Similarly, depending on the type of flue gas source and fuel source, the $SO_x$ content (and more typically the $SO_2$ content) of flue gas that is fed into the quench section is between about 10 ppm and about 500 ppm (and in some cases even higher), while the $NO_x$ content is typically between about 10 ppm and about 500 ppm. Still further, it should be appreciated that the hot flue gas will enter the quench section at a relatively low pressure (typically between about 10 psi below and 30 psi above atmospheric pressure, and even more typically between about 5 psi below and 10 psi above atmospheric pressure).

Quenching is most preferably carried out in the absence of any caustic (e.g., NaOH, KOH, etc.) and/or other chemical suitable for significant $SO_x$ and $NO_x$ absorption, and it is generally preferred that the quench medium is water or predominantly comprises water (e.g., >95 vol %). Consequently, the quench medium will only contain minimal amounts of dissolved or hydrated $SO_x$ and $NO_x$ while the predominant amount of these contaminants travels upwards in the quenched gas to the scrubbing section via the chimney tray. Under most typical conditions, the quench section will be operated such that less than 10%, more typically less than 5%, and most typically less than 3% of total $SO_x$ is absorbed in the quench section by the quench medium.

With respect to the configuration of suitable quench sections it is noted that there are numerous configurations for quench beds known in the art, and that all of such configurations are deemed appropriate for use herein. Thus, quench beds may include mass and heat transfer devices other than packed beds (e.g. spray nozzles, trays, or tray-like devices). Typically, but not necessarily, the quench medium is circulated in a quench circuit (recycled) and cooled by a cooler prior to re-entry into the quench section.

Typically, the quench zone has a water circulation rate of approximately 2-20 gpm/ft² (based on the column cross sectional area), more typically 5-15 gpm/ft², and most typically about 10 gpm/ft². Lower values are generally preferred (e.g., 3-5 gpm/ft²) if the gas is cooler, the water content of the gas is lower, the allowable circulating water temperature rise is increased, and/or the column diameter is set by another, unrelated factor (e.g. column availability or ease of construction). Higher rates are less contemplated (but not excluded) as the column diameter is based on the approach to flood in this region of the contactor, and a higher liquid rate would necessitate a greater column diameter.

Most typically, the flue gas enters at the exhaust gas temperature, which is typically 100° C. to 200° C., but can be as high as 350° C. or higher (see above). The temperature of the quenched flue gas will typically, and among other factors, depend on the temperature of the available quench medium. Where the quench medium is or predominantly comprises water, a preferred temperature approach will be in the range of about 5-15° C., and most typically at about 10° C. between the cooling medium and the exiting flue gas. As most cooling water has a temperature of around 25-40° C., flue gas will exit the quench section at a temperature of about 35°-50° C. Furthermore, the temperature of the quench medium is also related to the cooling medium temperature. In especially preferred aspects, a 2-10° C., and more preferably about 5° C. temperature approach between the cooling medium of the cooler and the quench medium entering the cooler is implemented. Typically, the quench water enters the quench zone at approximately 30-45° C. and leaves the quench zone at approximately 45-65° C.

Where desirable, excess water can be removed from the quench circulation using a drain line to a sewer system or other water sink, or more preferably, be reused in the plant. For example, a portion of the water can be used to compensate for losses in the scrubbing section, to provide at least a portion of boiler feed water and/or cooling water. Where desired or needed, the discharged water from the quench circulation may be neutralized or be treated in an ion exchange medium to remove (typically anionic) ions. Of course, and depending on the particular configuration, it is contemplated that all flow control elements may be manually and/or automatically actuated.

It should be noted that the amount of water condensed from the inlet flue gas depends, among other factors, on the water content of the entering gas and the quench temperature. In especially preferred aspects of the inventive subject matter, the flue gas will be cooled to its dewpoint and then subcooled (with respect to the dewpoint) in the quench zone. Thus, the quenched flue gas will preferably leave the quench section at a temperature that is below the adiabatic saturation temperature of the flue gas. Therefore, and viewed from a different perspective, the flue gas leaving the quench section is saturated with water, however, will contain less water than when entering the quench section. Typical ranges for water content in contemplated flue gases are between about 6 vol % and about 20 vol % in the flue gas entering the quench section, and between about 2 vol % and about 12 vol % in the flue gas exiting the quench section. Thus, for a flue gas containing about 10 vol % $H_2O$ at the quench inlet and about 5% $H_2O$ at the quench outlet, the condensation rate is approximately 2.4 lb $H_2O$ per 1000 scf of flue gas. As already discussed above, the condensed water is bled from the quench section to maintain proper operating liquid levels in the quench section. Therefore, it should be appreciated that the amount of condensation in the scrubbing section is nearly zero. Viewed from a different perspective, the temperatures are preferably controlled such that only enough water is condensed in the scrubbing section to balance the water lost in the blowdown stream. In this way, the volume of chemical-containing blowdown (waste) stream from the desulfurization section is minimized, and with that, water as well as chemicals are preserved.

The scrubbing section is preferably fluidly coupled to the quenching section, and most preferably in a combined quench-scrubber tower. Therefore, and among other options, the quench-scrubber tower will be configured to receive the quenched flue gas through a chimney tray or other structure that separates the circulating fluids of the quench section and the scrubbing section. However, in alternative aspects, the quench section and the scrubbing section may also be physically separate structures that are fluidly coupled to each other such that at least a portion of the quenched flue gas is fed to the scrubbing section. Similarly, and depending on the particular nature of the flue gas, there may be more than one quench and/or scrubbing section.

Most typically, the scrubbing medium in the scrubbing section is based on an aqueous caustic solution (e.g., aqueous solution of at least one of an earth alkaline metal hydroxide, an alkaline metal hydroxide, and/or ammonium hydroxide), and/or other absorption chemicals (e.g. $Na_2CO_3$) and may contain other reaction products (e.g. sodium sulfite $Na_2SO_3$), which may further increase the efficiency of the $SO_x$ and $NO_x$ absorption process. The absorption chemical(s) in the scrubbing medium are typically at a concentration equivalent to those commonly used in the art. Therefore, where the scrubbing medium comprises a caustic, the concentration of the caustic is preferably continuously held at a predetermined concentration of equal or greater than 8 wt % and more typically equal or greater than 10 wt % (corresponding to initially added caustic).

The circulation rate of the scrubbing medium in the scrubbing section of contemplated systems will generally be less than the circulation rate of the quench medium in the quench section, however, in rare cases, the circulation rate of the scrubbing medium may also be higher. Most preferably, the circulation rate of the scrubbing medium in the scrubbing section is adjusted to about 50% to 75% of the circulation rate of the quench medium in the quench section as such rate will typically provide a desirable balance between a minimum scrubbing section bed height, the vapor pressure drop, and the vapor compression operational expense (which is inversely related to circulation rate) and circulation equipment capital and operational expense (which is directly related to the circulation rate). Consequently, the circulation rate of the scrubbing medium is typically between about 2-12 gpm/ft$^2$, and more typically between about 5-8 gpm/ft$^2$.

With respect to the operating temperature ranges in the scrubbing section it should be appreciated that the quenched flue gas enters the scrubbing section at or below the quench section outlet temperature. The temperature change in the scrubbing section is generally very small, such that the temperature of the scrubbed flue gas leaving the scrubbing section is within about 0.5° C. to 5° C., and more typically between about 1° C. to 2° C. of the temperature of the quenched flue gas entering the scrubbing section. Thus, the circulating scrubbing medium enters and leaves the scrubbing section at approximately the same temperature as the quenched flue gas (typically between about 35° C.-50° C.), depending on the cooling medium temperature. Where desirable, the circulating scrubbing medium may be cooled using a heat sink, and excess circulating scrubbing medium may be temporarily stored in a recirculation tank.

Therefore, and depending on the particular configurations and operational conditions, it is contemplated that the scrubbing medium will have a continuous concentration and circulation rate effective to achieve remaining SO$_2$ in the scrubbed flue gas of equal or less than 10 ppm, more typically equal or less than 5 ppm, and most typically equal or less than 3 ppm. Thus, the inventors also contemplate a method of reducing SO$_2$ in a flue gas to a concentration of equal or less than 10 ppm in which flue gas is quenched with a quench medium to a temperature and under conditions such that the concentrated downstream scrubbing medium remains substantially undiluted by condensation of water from the quenched flue gas.

Therefore, a flue gas treatment system according to the inventive subject matter may generally include a quench section configured to receive a flue gas at a first temperature, wherein the quench section is further configured to reduce the temperature of the flue gas to a second temperature using water as a quench medium. A scrubbing section is fluidly coupled to the quench section and configured to receive the quenched flue gas at the second temperature, wherein the scrubbing section is also configured to contact the quenched flue gas with a caustic solvent. Most typically, the quench section and the scrubbing section are configured to allow operation in which substantially no water is condensed from the flue gas in the quench section, wherein the scrubbing medium has a concentration effective to produce a scrubbed flue gas having a continuous SO$_2$ concentration of less than 10 ppm, more typically less than 5 ppm, and most typically less than 3 ppm.

Thus, specific embodiments and applications of two-stage quench scrubbers have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A method of treating a flue gas to continually reduce at least one of SOx and NOx, comprising the steps of:

feeding a flue gas having a SOx concentration of between 10-200 ppm, a NOx concentration of between 10-500 ppm, and a pressure of between −10 psig and 30 psig at a first temperature to a quench section having water as a quench medium that is circulated in a quench medium circulation system comprising a cooler, and quenching the flue gas in the quench section at a temperature approach of 5-15° C. between the quenched flue gas and the quench medium in the absence of any caustic or other chemical suitable for significant SOx and NOx absorption to a second temperature in direct counter-current contact with water as a quench medium;

feeding the quenched flue gas to a scrubbing section and scrubbing the quenched flue gas in the scrubbing section in direct counter-current contact with an aqueous caustic solution as a scrubbing fluid at a concentration effective to continuously reduce at least one of SOx and NOx content in scrubbed flue gas to a predetermined concentration;

wherein the scrubbing fluid is recirculated via a pump between the scrubbing section and a recirculation tank;

wherein the quench and scrubbing sections are configured to use separate solvent circulation systems in which the flue gas is first quenched with a quench medium in a first system, in which water condensed from the quenched flue gas is removed from the quench section, and in which the quenched flue gas is scrubbed using a caustic aqueous solvent in a second system, and further in which a portion of the caustic aqueous solvent is removed from the scrubbing section, wherein the first system has a greater circulation rate than the second system;

wherein the quench and scrubbing sections are in a single tower; and wherein the quench section is operated such that quenched flue gas leaves the quench section at a temperature that is below an adiabatic saturation temperature of the flue gas.

2. The method of claim 1 wherein the flue gas is provided from a source selected from the group consisting of a coal incinerator, a hydrocarbon fuel fired incinerator, and a natural gas fired incinerator, and wherein the predetermined concentration is equal or less than 10 ppm.

3. The method of claim 1 wherein the first temperature is between 100° C. and 300° C.

4. The method of claim 1 wherein the second temperature is between 90° C. and 20° C.

5. The method of claim 1 wherein the quench section is operated such that less than 10% of total $SO_2$ is absorbed in the quench section.

6. The method of claim 1 wherein the quench medium is circulated in a quench circuit and cooled by a cooler prior to re-entry into the quench section.

7. The method of claim 1 wherein the caustic comprises at least one of an earth alkaline metal hydroxide, an alkaline metal hydroxide, and ammonium hydroxide.

8. The method of claim 1 wherein the concentration of the caustic is continuously held at a concentration corresponding to initial addition of caustic of equal or greater than 10 wt %.

9. The method of claim 1 further comprising a step of draining optionally neutralized quench medium to a sewer or process component of a plant.

10. A method of continually reducing at least one of SOx and NOx in a flue gas having a SOx concentration of between 10-200 ppm, a NOx concentration of between 10-500 ppm, and a pressure of between −10 psig and 30 psig to a predetermined concentration, comprising the steps of:
   quenching flue gas in direct counter-current contact and in the absence of any caustic or other chemical suitable for significant SOx and NOx absorption with a quench medium in a quench section having water as a quench medium that is circulated in a quench medium circulation system that comprises a cooler to a temperature that is below an adiabatic saturation temperature of the flue gas,
   wherein the step of quenching uses a temperature approach of 5-15° C. between the quenched flue gas and the quench medium,
   wherein the quench medium is separate from a concentrated aqueous downstream scrubbing medium that is circulated in a scrubbing medium circulation system to thereby allow the concentrated aqueous downstream scrubbing medium in a scrubbing section to remain substantially undiluted by condensation of water from the quenched flue gas,
   wherein the quench medium circulation system has a greater circulation rate than the scrubbing medium circulation system;
   wherein the scrubbing medium is recirculated via a pump between the scrubbing section and a recirculation tank;
   wherein water condensed from the quenched flue gas is removed from the quench section;
   wherein the quenching and scrubbing are performed in separate sections of a single tower; and
   wherein a portion of the concentrated aqueous downstream scrubbing medium is removed from the scrubbing section, wherein the scrubbing medium moves in direct counter-current contact relative to the flue gas, and venting the scrubbed flue gas.

11. The method of claim 10 wherein the quench medium is water, wherein the concentrated scrubbing medium comprises a caustic, and wherein the predetermined concentration of the at least one of SOx and NOx is less than 10 ppm.

12. The method of claim 10 wherein the quench medium is circulated and wherein at least one of water condensed from the flue gas and the quench medium drained in the sewer is used in a process component of a plant.

13. The method of claim 10 wherein the quenching is performed such that less than 10% of total $SO_2$ is absorbed in the quench section.

14. The method of claim 10 wherein the concentration of the concentrated scrubbing medium is continuously held at a concentration corresponding to initial addition of caustic of equal or greater than 10 wt %.

15. A flue gas treatment system, comprising:
   an incinerator configured to provide a flues gas having a SOx concentration of between 10-200 ppm, a NOx concentration of between 10-500 ppm, and a pressure of between −10 psig and 30 psig;
   a quench section comprising a counter-current contacting section fluidly coupled to a quench medium circulation system comprising a cooler, wherein the quench section is configured to receive the flue gas from the incinerator at a first temperature, and to produce a quenched flue gas at a temperature approach of 5-15° C. between the quenched flue gas and the quench medium, wherein the quenched flue gas has a temperature that is below an adiabatic saturation temperature of the flue gas, wherein the quench section is further configured to reduce the temperature of the flue gas in the absence of any caustic and/or other chemical suitable for significant SOx and NOx absorption to a second temperature in direct counter-current contact with water as a quench medium;
   a scrubbing section fluidly coupled to the quench section and configured to receive the quenched flue gas at the second temperature, wherein the scrubbing section is further configured to contact the quenched flue gas in direct counter-current contact with an aqueous caustic solvent;
   a pump fluidly coupled between the scrubbing section and a recirculation tank and configured to recirculate the aqueous caustic solvent between the scrubbing section and a recirculation tank,
   wherein the quench section and the scrubbing section are configured to use separate solvent circulation systems in which the flue gas is first quenched with a quench medium in the first system, in which water condensed from the quenched flue gas is removed from the quench section, and in which the quenched flue gas is scrubbed using a caustic aqueous solvent in a second system to thereby substantially avoid net condensation of water in the scrubbing section, and further in which a portion of the caustic aqueous solvent is removed from the scrubbing section, wherein the first system has a greater circulation rate than the second system;
   wherein the quench and scrubbing sections are in a single tower; and
   wherein the caustic solvent has a concentration effective to produce a scrubbed flue gas having a continuous $SO_X$ or NOx concentration of less than 20 ppm.

16. The system of claim 15 wherein the quench medium is recirculated and wherein the system further comprises a cooler that cools the re-circulated water.

17. The system of claim 15 wherein the scrubbing medium comprises a caustic at a concentration corresponding to initial addition of caustic of equal or greater than 10 wt %.

18. The system of claim 15 wherein the quench section is configured to accommodate condensed water from the flue gas.

* * * * *